E. Weissenborn,
Lubricator.
№ 45,945. Patented Jan. 17, 1865.

Witnesses.
Henry T. Brown
A. F. Schlegel.

Inventor.
Edw. Weissenborn.

UNITED STATES PATENT OFFICE.

EDWARD WEISSENBORN, OF HUDSON CITY, NEW JERSEY.

IMPROVEMENT IN OIL-CUPS.

Specification forming part of Letters Patent No. 45,945, dated January 17, 1865.

*To all whom it may concern:*

Be it known that I, EDWARD WEISSENBORN, of Hudson City, in the county of Hudson and State of New Jersey, have invented a new and useful Improvement in Oil-Cups; and I do hereby declare that the following is a full, clear, and exact description of the same, reference being had to the accompanying drawings, forming part of this specification, in which—

Figure 1:
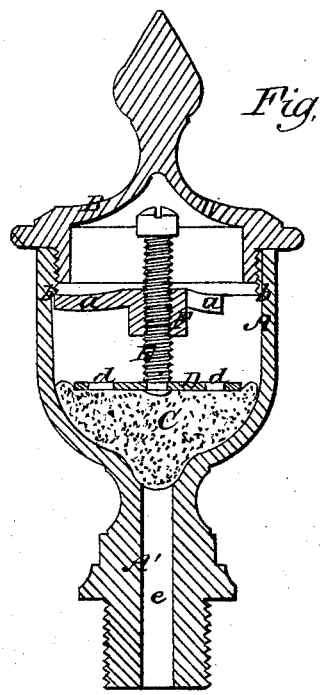
Figure 2:
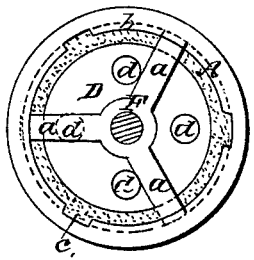

Figure 1 is a central vertical section of my invention. Fig. 2 is a plan of the same with the cover removed.

Similar letters of reference indicate corresponding parts in both figures.

My invention consists in a novel mode of applying a screw, nut, and follower within an oil-cup, and in combination with a sponge or other compressible porous body arranged at the bottom thereof, whereby provision is made for accurately regulating the supply of oil from the cup to a journal or other surface or surfaces and the oil so supplied is perfectly filtered.

To enable others skilled in the art to construct oil-cups according to my invention, I will proceed to describe it with reference to the drawings.

A is a cup, of metal or other material, made preferably with the interior of its bottom of a concave rounded form, and having a hollow stem, A', through which the oil passes to the journal or other surfaces to be lubricated.

B is the cover, screwed into or otherwise secured in place.

C is the sponge or compressible-porous substance, placed in the bottom of the cup and covering the passage *e* in the hollow-stem.

D is the follower, consisting of a flat perforated disk of smaller diameter than the interior of the cup, arranged above the sponge C and attached to the lower end of the central screw, E, in such manner as to permit the said screw to turn freely without turning the disk.

F is the nut fitted to the thread of the screw E and having radial wings *a a*, which have a bearing against the under surface of an inwardly-projecting shoulder, *b*, provided within the upper part of the cup.

To provide for the insertion of the nut, there are provided in the upper part of the cup, above the shoulder *b*, vertical grooves *c c*, corresponding in number with the radial wings *a a*, the said grooves permitting the passage of the said wings and thereby allowing the nut to be dropped into the cup to a position below the shoulder *b*. When the nut has been dropped in, it is turned to bring the wings under the shoulder *b*, and the screw E is turned by the fingers or by means of a screw-driver or wrench to produce a suitable pressure of the follower D upon the sponge. This adjustment of the screw may be made before or after the cup has been filled with oil.

The only object of the cover is to exclude dust and dirt and to prevent the oil from splashing out of the cup when it is attached to a moving body, the nut being entirely independent of the said cover.

The oil, in order to reach the passage *e*, has to pass around the edges of the follower or through the holes *d d*, provided therein, and through the sponge C, and in passing through the sponge it is perfectly filtered. The supply through the passage *e* may be regulated with the most perfect accuracy by the adjustment of the screw E in the nut, to regulate the degree of compression of the sponge. The greater the degree of compression of the sponge the less will be the supply of oil, and vice versa.

When it is desired to remove the sponge to clean it or replace it by a new one, the cover B is taken off and the nut turned to bring its wings *a a* opposite the grooves *c c*. The nut, screw, and follower can then be withdrawn together from the cup, and the sponge can be taken out.

What I claim as my invention, and desire to secure by Letters Patent, is—

The sponge C, the follower D, screw E, and movable winged nut, F, applied in combination with each other and with the oil-cup, and operating substantially as herein specified.

EDW. WEISSENBORN.

Witnesses:
HENRY T. BROWN,
J. W. COOMBS.